United States Patent
MacDonald et al.

(10) Patent No.: US 6,540,618 B1
(45) Date of Patent: Apr. 1, 2003

(54) STEERING COLUMN SLIDER ASSEMBLY

(75) Inventors: Brian MacDonald, Thomaston, CT (US); Christopher D. Roehl, New Hartford, CT (US); Joseph Garelli, Colcheser, CT (US); Andrew Jarl, New Hudson, MI (US); John L. Vitali, New Hartford, CT (US); John A. Zannotti, Simsbury, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/669,372

(22) Filed: Sep. 26, 2000

(51) Int. Cl.[7] ................................................. F16D 3/84
(52) U.S. Cl. ........................................ 464/173; 464/175
(58) Field of Search ................................ 464/162, 167, 464/173, 175; 403/51, 383; 74/492; 277/634, 635, 636

(56) References Cited

U.S. PATENT DOCUMENTS

| | | | | | |
|---|---|---|---|---|---|
| 2,923,140 A | * | 2/1960 | Weasler | ....................... | 464/162 |
| 3,344,618 A | * | 10/1967 | Young | ....................... | 464/162 |
| 3,817,057 A | * | 6/1974 | Orain | ....................... | 464/175 X |
| 4,667,530 A | * | 5/1987 | Mettler et al. | ........... | 464/162 X |
| 5,525,112 A | * | 6/1996 | Smith | ....................... | 464/175 X |
| 5,538,474 A | * | 7/1996 | Kretschmer et al. | ......... | 464/162 |
| 5,833,542 A | * | 11/1998 | Harrold et al. | ............. | 464/175 |
| 5,919,094 A | * | 7/1999 | Yaegashi | ..................... | 464/162 |
| 6,038,941 A | * | 3/2000 | Hobaugh, II et al. | ... | 464/167 X |

FOREIGN PATENT DOCUMENTS

| | | | | |
|---|---|---|---|---|
| EP | 0213977 | | 3/1987 | |
| EP | 0363269 | | 4/1990 | |
| GB | 2 079 886 A | * | 1/1982 | ................. 464/175 |
| GB | 2284298 | | 5/1995 | |

OTHER PUBLICATIONS

U.K. Search Report dated Jan. 11, 2002.

* cited by examiner

*Primary Examiner*—Greg Binda
(74) *Attorney, Agent, or Firm*—Michael Best & Friedrich LLP

(57) ABSTRACT

A steering column slider shaft assembly includes a shaft and yoke assembly having yoke at a first end and an attached non-cylindrical shaft extending therefrom to a second end. The second end is engaged with a non-cylindrical tube which forms a second end of a tube and yoke assembly, the tube being congruent with and adapted to slidably receive the shaft and provide a slip fit therefor. The shaft and yoke assembly and the tube and yoke assembly each have interengaging provisions which are over-molded or otherwise attached, for sealing the slider shaft assembly. The interengaging provisions also serve to limit extension of the slider assembly to resist inadvertent separation of the slider shaft assembly during assembly of the steering column.

11 Claims, 3 Drawing Sheets

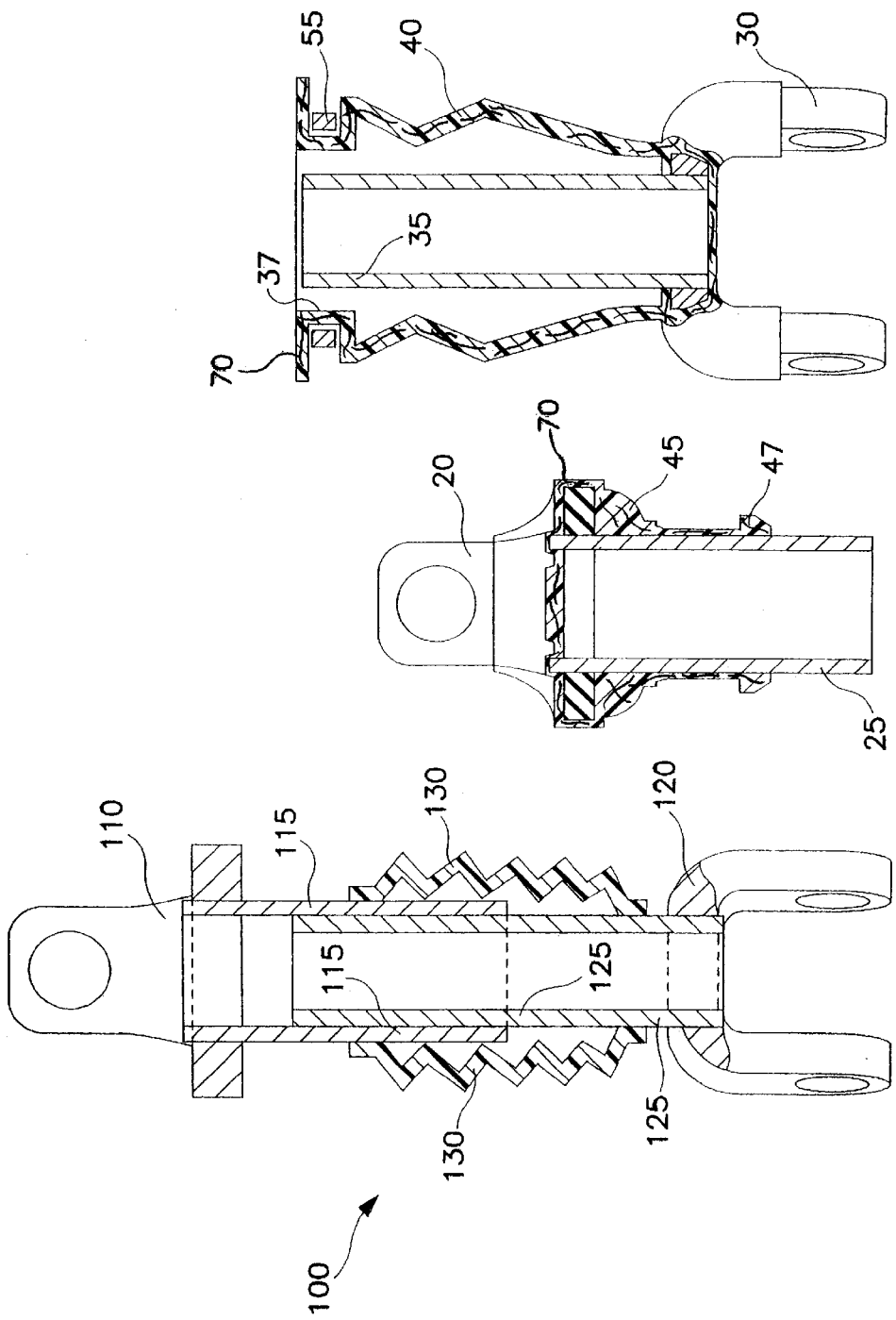

STEERING COLUMN SLIDER ASSEMBLY

BACKGROUND OF THE INVENTION

This invention relates generally to steering column slider assemblies and more particularly to steering column slider assemblies with combined sealing and anti pull-apart features.

Steering columns in motor vehicles include slider assemblies, made up of a shaft and yoke, or shaft and foot, assembly slidably inserted within a tube and yoke, or tube and foot assembly, to accommodate variations in the distance between the vehicle dash panel and the steering gear box due to manufacturing tolerances. Use of the slider shafts facilitates assembly of the vehicle by accommodating slight variances in the positions of the steering gear box and the steering column. Slider shafts are also required for providing reach, or length, adjustability in steering columns.

Normal driving conditions also entail road shocks which cause relative motion between the body and frame. These move the steering gear box and the steering shaft connected to it. The slider shaft permits telescopic compliance of the steering shaft and absorbs the road shocks with minimal effect on the upper portion of the steering column and, thus, comfort of the operator. The normal telescopic motion of the slider is in the range of ½" or less.

Vehicle designs have become smaller and often require the steering column to have one or more bends to reach the steering gear box. Each such bend requires at least one universal joint which requires a significant axial space. As a result, slider shafts have become quite short in some designs in which the distance between the dash panel and the steering gear box is small and the angular deviation is relatively large.

Because of their location in the vehicle, the slider shafts are exposed to water, salt, and road debris which cause corrosion and wear and which ultimately lead to deterioration of the slide function and an objectionable degree of rotational lash in the steering mechanism. Rubber sealing boots are installed on the shafts and tubes of many slider assemblies to retain lubricant and exclude contamination, but they do not seal the ends of the shaft and the tube. Also, they eventually crack, due to mechanical, thermal, or chemical attack, or otherwise develop leaks which permit loss of lubricant and entry of the contamination at the slider joint.

Currently, in order to prevent inadvertent separation of the tubes and shafts of slider assemblies during subsequent assembly into the steering column of the vehicle, the end of the shaft is deformed, by staking or otherwise, after insertion into the tube. This is a very effective retention measure, and, except when the slider becomes too short, suffices. However, at or near some lower limit of slider length, there is insufficient space to permit such deformation of the end of the shaft after assembly, and another method must be found to provide the anti-pull-apart feature.

The foregoing illustrates limitations known to exist in present sealing and anti pull-apart features of steering shaft slider assemblies. Thus, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a steering column slider shaft assembly which comprises a shaft assembly with a yoke at a first end thereof and an attached non-cylindrical shaft extending therefrom to a second end; a tube assembly comprising a non-cylindrical tube with an attached yoke at a first end, the tube being congruent with and adapted to slidably receive the shaft and to provide a slip fit therefor within a second end thereof; and means for sealing the slider shaft assembly.

The foregoing and other aspects will become apparent from the following detailed description of the invention when considered in conjunction with the accompanying drawings.

BRIEF DESCRIPTION OF THE DRAWINGS

FIG. 1 is a schematic longitudinal sectional view of a slider assembly of the prior art;

FIGS. 2a and 2b are schematic longitudinal sectional views of the tube and yoke and the shaft and yoke, or foot, respectively, of a slider assembly according to the invention;

DETAILED DESCRIPTION

Figure 5:
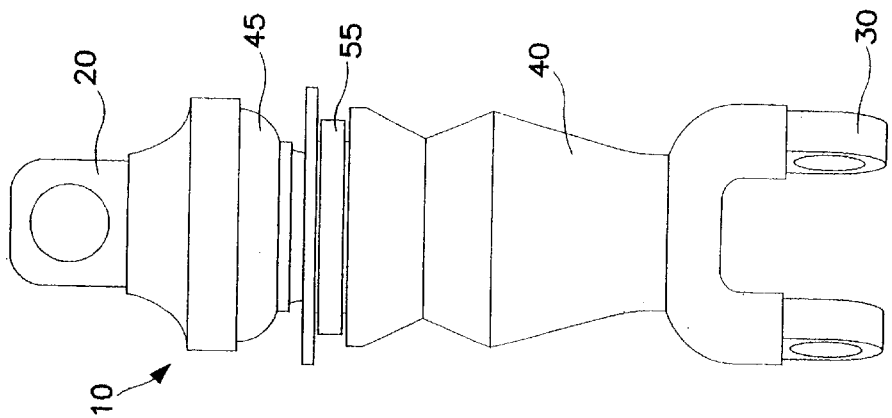
FIG. 5 is a schematic overall view of the slider shaft of the invention as shown cut away in FIG. 3.

A slider shaft assembly 100 of the prior art, as seen in FIG. 1, has a yoke or foot 110 with an attached non-cylindrical tube 115 which is slidably engaged with a yoke 120 with an attached non-cylindrical shaft 125 to provide rotational drive transmission between the yokes. (Note that "non-cylindrical" denotes shafts and tubes of any shape which have one or more axially extending radial projections or recesses to provide rotational interlock between the shafts and tubes.) The shaft 125, which may be hollow, as shown, or solid, nests inside the tube 115 to provide smooth extension and collapse of the slider shaft assembly 100 to accommodate relative axial movement of the tube and shaft during assembly or due to road shocks and vibrations in service. In motor vehicle steering shafts, such accommodation isolates the operator from the movements and reduces fatigue. To protect the slide function from deterioration due to contamination and corrosion, some slider assemblies incorporate a flexible boot 130 to provide a seal over the slider joint while still permitting smooth axial extension and collapse. This is effective as a seal over the engaging ends of the shaft 125 and tube 115 until the seal between the boot 130 and shaft 125 or tube 115 begins to leak or until the boot becomes embrittled and cracks. However, it does not seal the ends of the shaft and tube where they penetrate the yokes 110, 120. During operation of the vehicle, road debris, water, salt, and mud may splash on the slider shaft assembly and enter the slider mechanism through the yoke ends of the shaft and tube to cause wear and corrosion of the slider assembly. Also, this type of boot 130 clamps directly to the engaging surface of the inner shaft 125 and to the outer shaft or tube 115, thereby reducing the available telescopic capability of the slider assembly.

Figure 3:
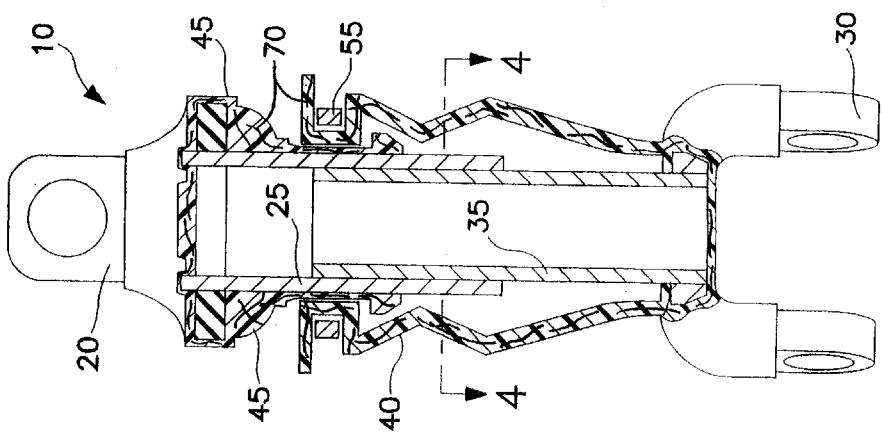
FIG. 3 is a schematic longitudinal sectional view of the slider assembly embodying the invention.

FIGS. 2a, 2b, and 3 show the slider shaft assembly 10 of the invention. It comprises a yoke or foot 20, with an attached non-cylindrical tube 25, which is preferably over-molded with a low-modulus flexible polymeric cover 45, and another yoke or foot 30, with an attached non-cylindrical shaft 35, over-molded with a convoluted boot 40, also of a low-modulus flexible polymeric material. It is important, especially in cases involving short sliders, that the over molded boot 40, as seen in FIG. 3, does not interfere with full-length telescopic action of the shaft 35 and tube 25. In some cases, depending on the material chosen, it may be preferred to press or stake or otherwise attach the low-modulus coating on the tube and the shaft. The cover 45 and boot 40 completely seal the ends of the shaft 35 and tube 25 where they penetrate the feet or yokes 30, 20, respectively. The cover 45 has an external circumferential ridge 47 about its interengaging end, and the boot 40 has an internal circumferential ridge 37 about its interengaging end. When assembling the slider shaft assembly 10, the shaft 35 is inserted into the tube 25 until the interengaging ends of the cover 45 and the boot 40 are in contact with each other. The circumferential ridge 37 of the boot is stretched and pushed past the external circumferential ridge 47 of the flexible cover 45 to lock the boot to the cover and to seal the interengaging joint. Because of the low modulus of the polymer of the cover and boot, the seal is sufficiently tight to exclude contamination from the slider. By proper selection of the thickness and the modulus of the polymer of the boot 40 and cover 45, it is possible to tailor the axial compliance of the slider shaft assembly to provide a desired degree of axial damping for a slider of any particular vehicle for its intended service. This invention also provides a continuous seal over the yoke ends of the shaft and tube and over a substantial portion of the yoke ears as well. Thus, once the cover 45 and boot 40 are interengaged, the slider assembly is completely sealed to exclude contaminants and to retain any lubricant desired for the slider. A clamp ring 55 may be installed on the boot 40 over the internal ridge 37 to increase the clamping force at the seal. This ring 55 also serves as an added anti pull-apart feature for the slider shaft assembly 10. In cases in which the slider is very short due to vehicle design restrictions, there is a heightened possibility of the slider assembly separating during assembly of the automobile. The anti pull-apart feature is especially important in such designs to avoid loss of or contamination of lubricant and mis-orientation between the tube and shaft which can occur on separation, especially with geometries such as splines or others susceptible to re-assembly in slightly incorrect orientations.

Reinforcement fibers 70 or mats may be molded in the cover 45 and boot 40, and, in combination with the clamp ring 55, can provide added anti-pull-apart protection. FIG. 5 shows a non-cut-away view, as in FIG. 3, of the seal and anti-pull-apart device, including the clamp ring 55, illustrating the sealing extent of the cover and boot on the yokes of the assembly.

Figure 4A:
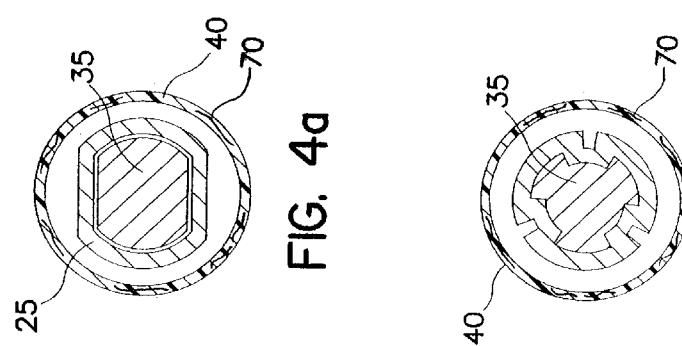
FIGS. 4a and 4b are cross-sectional views of the slider assembly taken along line 4—4 of FIG. 3 showing two possible embodiments of the non-cylindrical shape of the tube and shaft.
Figure 4B:
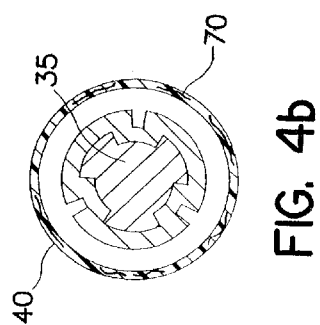

The non-cylindrical tube 25 and shaft 35 are illustrated in FIGS. 4*a* and 4*b* which are transverse sections taken on line 4—4 of FIG. 3. The shaft 35 is shown solid, but it is often made as a hollow tubular part. The tube 25 and shaft 35 are surrounded by the boot 40. The shaft 35 is slidably inserted in the tube and has a non-cylindrical outer surface which meshes with a congruent non-cylindrical inner surface of the tube 25 to permit relative axial movement between the two parts but no relative rotation between them. These two figures show only two of a virtually infinite selection of non-cylindrical forms for such rotary drive shafts. It is sufficient that the shaft and tube each have at least one congruent radially projecting feature on their outer and inner surfaces, respectively, to provide the rotational interlock needed while still permitting relative axial movement.

Comparing FIGS. 3 and 5 to FIG. 1, the sealing improvement provided by the invention over that of the prior art is clear. The prior art slider assembly 100 is open at the ends where the yokes 110, 120 are penetrated by the tube 115 and the shaft 125. The boot 130, in addition to reducing the telescoping capability of the assembly, only seals the outside of the interengaged portion of the assembly, while the inside is open at both ends. The slider assembly 10 of the invention is completely encapsulated, except for only the ends of the ears of the yokes or feet 20, 30. Once the tube and yoke (FIG. 2*a*) and the shaft and yoke (FIG. 2*b*) are interengaged (FIGS. 3 and 5), the slider shaft assembly 10 is sealed on all sides to exclude contaminants and to retain lubricant. The external ridge 47 on the cover 45 and the internal ridge 37 on the boot 40 provide a very strong anti-pull-apart function compared to the boot 130 of the prior art in FIG. 1. With incorporation of the clamp ring 55, as preferred, and with addition of molded-in reinforcement fibers or mats, the strength of the anti pull-apart function is increased by a large multiple.

Figure 6C:
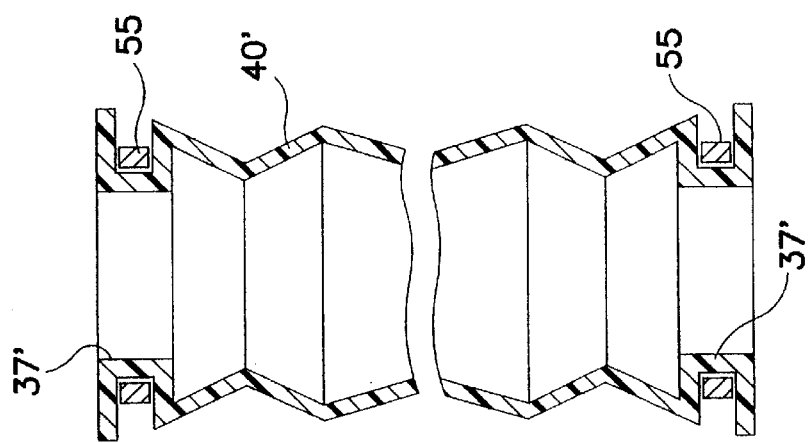
FIGS. 6a, 6b, and 6c are schematic sectional illustrations of a long slider embodiment of the invention.
Figure 6B:
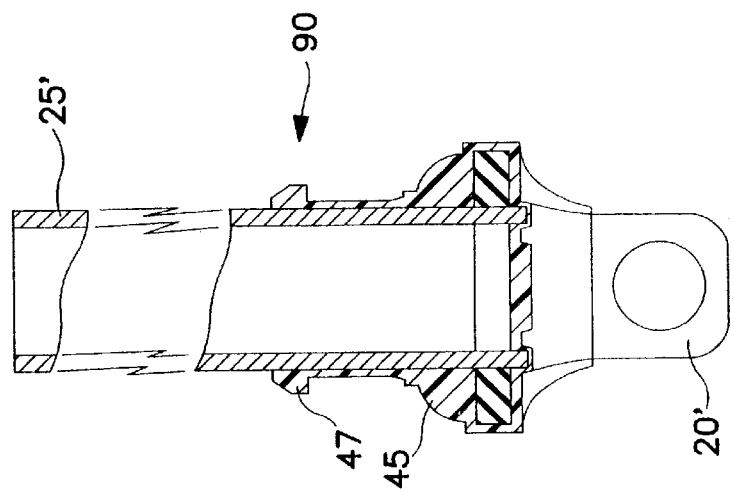
Figure 6A:
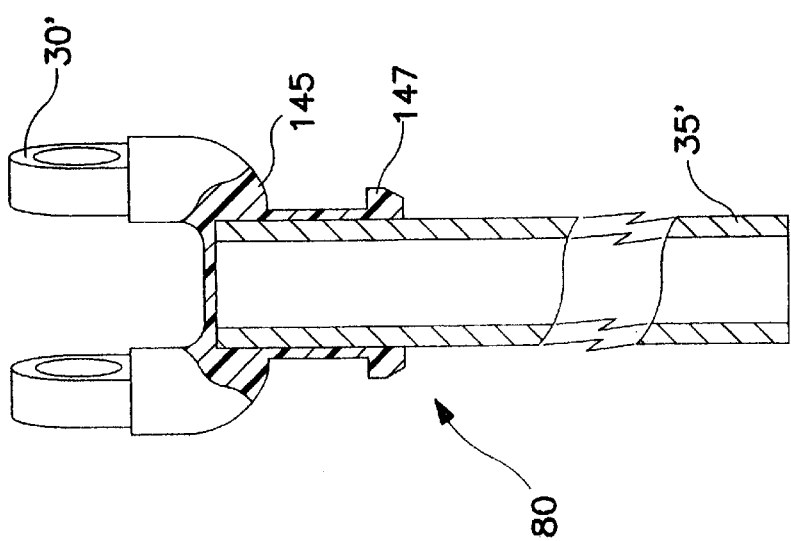

The components of a long slider embodiment of the invention are shown in FIGS. 6*a*, 6*b*, and 6*c*, in which the shaft and foot 80, the outer tube and yoke (or foot) 90, and the long slider boot 85 are illustrated. The long hollow shaft 35' has a cover 145 which extends from the yoke end of the shaft partially over the ears of the foot 30'. An external ridge 147 is provided at the end of the cover 145 for engagement with an internal ridge 37' on the boot 40' after assembly of the slider. The long outer tube or shaft 25' in FIG. 6*b*, except for the length of the tube 25', is the same in all respects as the shaft 25, in FIG. 2*a*. The cover 45, with its external ridge 47, extends from the foot end of the tube 25' partially over the ears of the yoke 20'. The boot 40', seen in FIG. 6*c*, has, substantially, end-to-end functional symmetry with an internal ridge 37' at each end for engaging with the external ridges 47, 147 of the tube and yoke 90 and the shaft and yoke 80. A clamp ring 55 may be used at each end of the boot 40' after assembly with the covers 145, 45 to increase sealing and anti-pull-apart features for the long slider.

It is possible, if a solid shaft 35, 35' is used, to dispense with the cover 45, 145 and to provide an embossed or otherwise formed external ridge on the yoke end of the shaft for interengagement with the internal ridge 37, 37' of the boot 40, 40'. The sealing and anti-pull-apart behavior of the slider assembly would still be acceptable. The low-modulus of the boot provides excellent sealing engagement with hard or soft surfaces. This invention provides the sealing needed to exclude abrasive and corrosive road dirt and spatter from the slider, while also retaining grease or other lubricant within the slider joint. In addition, it provides anti pull-apart features to resist inadvertent separation of the shaft and tube during assembly of the vehicle without reducing the axial compliance needed to reduce transmission of road shocks.

Having described the invention, we claim:

1. A steering column slider shaft assembly, comprising:
    a shaft assembly comprising a yoke at a first end thereof and an attached non-cylindrical shaft extending therefrom to a second end;
    a tube assembly comprising a hollow tube having open first and second ends with at least a portion of an internal surface therebetween being non-cylindrical, the tube having a yoke attached about said open first end, said tube being congruent with and adapted to slidably receive said shaft within said open second end thereof; and
    means for sealing said slider shaft assembly including a flexible member formed about the tube such that the flexible member sealingly closes the tube open first end.

2. The steering column slider shaft assembly of claim 1, further comprising:

means for resisting separation of said shaft and said tube during extension of said slider shaft assembly.

3. The steering column slider shaft assembly of claim 2, wherein the flexible member is a flexible boot or a flexible cover and the means for sealing said slider shaft assembly further comprises the other of the flexible boot or the flexible cover on said shaft assembly, said flexible boot and said flexible cover sealingly interengaging one another.

4. The steering column slider shaft assembly of claim 3 wherein the shaft has first and second open ends and is substantially hollow therebetween, wherein the second shaft end is received in the tube and the flexible boot or flexible cover on the shaft is configured to sealingly close the shaft open first end.

5. The steering column slider shaft assembly of claim 1, wherein the flexible member is a flexible boot or a flexible cover and the means for sealing said slider shaft assembly further comprises the other of the flexible boot or the flexible cover on said shaft assembly, said flexible boot and said flexible cover sealingly interengaging one another.

6. The steering column slider shaft assembly of claim 5 wherein the shaft has first and second open ends and is substantially hollow therebetween, wherein the second shaft end is received in the tube and the flexible boot or flexible cover on the shaft is configured to sealingly close the shaft open first end.

7. The steering column slider shaft assembly of claim 1, wherein the flexible member is a flexible cover and the means for sealing said shaft and tube when assembled further comprises a flexible cover on said shaft assembly and a flexible boot extending between and sealingly interengaging with both said flexible covers.

8. The steering column slider shaft assembly of claim 7 wherein the shaft has first and second open ends and is substantially hollow therebetween, wherein the second shaft end is received in the tube and the flexible cover on the shaft is configured to sealingly close the shaft open first end.

9. A steering column slider shaft assembly, comprising:

a shaft assembly comprising a yoke at a first end thereof and an attached non-cylindrical shaft extending therefrom to a second end;

a tube assembly comprising a non-cylindrical tube with an attached yoke at a first end, said tube being congruent with and adapted to slidably receive said shaft within a second end thereof; and means for sealing said slider shaft assembly and resisting separation of said shaft and said tube during extension of said slider shaft assembly comprising a flexible boot on said shaft assembly or said tube assembly, a flexible cover on the other of said shaft assembly and said tube assembly, a circumferential external ridge on an interengaging end of said flexible cover and a circumferential internal ridge on an interengaging end of said flexible boot, said internal ridge being pushed past the external ridge to interengage therewith during assembly of the slider shaft assembly to seal the slider shaft assembly and resist separation.

10. The steering column slider shaft assembly of claim 9, further comprising:

an anti pull-apart feature comprising a circumferential clamp installed around said flexible boot over said circumferential internal ridge during assembly of the slider shaft assembly.

11. The steering column slider shaft assembly of claim 10, further comprising:

reinforcement strands or mats molded into said flexible boot to limit elastic extension of said boot during extension of said slider shaft assembly.

* * * * *